(12) United States Patent
Dunn et al.

(10) Patent No.: US 12,008,087 B2
(45) Date of Patent: Jun. 11, 2024

(54) SECURE REDUCED POWER MODE

(71) Applicant: Apple Inc., Cupertino, CA (US)

(72) Inventors: Alan M. Dunn, San Jose, CA (US);
Anish C. Trivedi, San Jose, CA (US);
Ronnie G. Misra, San Jose, CA (US);
Wade Benson, San Jose, CA (US);
Anand Dalal, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 17/505,318

(22) Filed: Oct. 19, 2021

(65) Prior Publication Data

US 2022/0129527 A1 Apr. 28, 2022

Related U.S. Application Data

(60) Provisional application No. 63/105,823, filed on Oct. 26, 2020.

(51) Int. Cl.
| | |
|---|---|
| *H04L 29/06* | (2006.01) |
| *G06F 1/3234* | (2019.01) |
| *G06F 21/31* | (2013.01) |
| *G06F 21/60* | (2013.01) |
| *G06F 21/62* | (2013.01) |
| *G06F 21/64* | (2013.01) |
| *H04L 9/32* | (2006.01) |

(52) U.S. Cl.
CPC ............ *G06F 21/31* (2013.01); *G06F 1/3234* (2013.01); *G06F 21/602* (2013.01); *G06F 21/62* (2013.01); *G06F 21/64* (2013.01); *H04L 9/3242* (2013.01); *H04L 9/3252* (2013.01)

(58) Field of Classification Search
CPC ...... G06F 21/31; G06F 1/3234; G06F 21/602; G06F 21/62
See application file for complete search history.

(56) References Cited

U.S. PATENT DOCUMENTS

| | | |
|---|---|---|
| 8,775,757 B2 | 7/2014 | Polzin et al. |
| 8,832,465 B2 | 9/2014 | Gulati et al. |
| 8,873,747 B2 | 10/2014 | Polzin et al. |
| 9,043,632 B2 | 5/2015 | Machnicki et al. |
| 9,047,471 B2 | 6/2015 | Polzin et al. |

(Continued)

OTHER PUBLICATIONS

IOS Security, iOS 11, Jan. 2018, Apple Inc., 82 pages.

*Primary Examiner* — Jason K Gee
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to maintaining device security associated with reduced power modes. In some embodiments, a computing device receives a request to place the computing device in a reduced power mode in which a first memory of the computing device is powered off. Based on the request, the computing device offloads a memory page from the first memory to a second memory such that the offloading includes encrypting the memory page. Based on a request to resume from the reduced power mode, the computing device restores the memory page from the second memory to the first memory such that the restoring includes decrypting the encrypted memory page. After initiating the restoring, the computing device presents a user authentication prompt asking for a user credential.

20 Claims, 6 Drawing Sheets

(56) References Cited

U.S. PATENT DOCUMENTS

| | | | |
|---|---|---|---|
| 9,547,778 | B1 | 1/2017 | Paaske et al. |
| 10,079,667 | B2 | 9/2018 | Benson et al. |
| 10,423,804 | B2 | 9/2019 | Benson et al. |
| 10,452,859 | B2 | 10/2019 | Tamura et al. |
| 2011/0252234 | A1 | 10/2011 | De Atley et al. |
| 2012/0185715 | A1* | 7/2012 | Reece .................. G06F 9/4418 713/323 |
| 2014/0006799 | A1* | 1/2014 | Zmudzinski .......... G06F 1/3243 713/189 |
| 2018/0349608 | A1 | 12/2018 | de Cesare et al. |
| 2019/0325729 | A1* | 10/2019 | Frost ..................... G08B 25/08 |
| 2020/0285753 | A1* | 9/2020 | Buendgen ............. G06F 21/577 |

* cited by examiner

SECURE REDUCED POWER MODE

The present application claims priority to U.S. Prov. Appl. No. 63/105,823, filed Oct. 26, 2020, which is incorporated by reference herein in its entirety.

TECHNICAL FIELD

This disclosure relates generally to computing devices, and, more specifically, to maintaining device security associated with reduced power modes.

DESCRIPTION OF THE RELATED ART

Power conservation can be an important consideration for computing devices, which, in some instances, may rely on a limited battery power supply. To reduce power consumption at times when a computing device may be underutilized, some computing devices support one or more reduced power modes. In some modes, a computing device may continue to operate but at a slower rate due to, for example, operating processors at a lower frequency (and a lower operating voltage), disabling processor cores, etc. In other, more conservative modes, a computing device may suspend operation and disable power consuming hardware such as processors, memory, network interfaces, etc. If volatile memory (e.g., random access memory (RAM)) is being powered off in such a mode, the memory contents may need to be moved to a non-volatile memory in order to preserve them until the computing device can resume normal operation. This type of reduced power mode may be referred to a "suspend-to-disk mode" or a "hibernation mode."

DETAILED DESCRIPTION

Reduced power modes that offload memory contents from volatile memory to non-volatile memory may create a potential vulnerability in which an attacker can modify the offloaded contents in the non-volatile memory to achieve some malicious purpose when the computing device resumes normal operation. These contents may, for example, be included in memory pages belonging to the operating system and may normally be protected by the operating system when the computing device is not in a reduced power mode. These protection mechanisms, however, may not be implemented when, for example, the operating system is not executing. One approach to improving the security of a computing device is to encrypt memory contents being offloaded using a key protected by a user credential. This approach, however, can increase the length of time required to resume from a reduced power mode as contents cannot be decrypted until a user credential is obtained, which may occur later in the resumption process.

The present disclosure describes embodiments in which a computing device initiates restoring encrypted memory pages prior to presenting a user authentication prompt. As will be described in greater detail below, in various embodiments, a computing device receives a request to place the computing device in a reduced power mode in which a first memory (e.g., RAM) of the computing device is powered off. Based on the request, the computing device offloads a memory page from the first memory to a second memory (e.g., a solid state drive (SSD)) of the computing device). The offloading includes encrypting the memory page, which, in some embodiments, may include using a cryptographic key that is not derived from a user credential and may be used solely for offloaded memory pages. Based on a request to resume from the reduced power mode, the computing device restores the memory page from the second memory to the first memory including decrypting the encrypted memory page. After initiating the restoring, the computing device presents a user authentication prompt asking for a user credential. In some embodiments, based on the outcome of this authentication, the computing device grants access to other data stored in the second memory (e.g., a user's files, home directory, etc.), which may be decrypted using a second cryptographic key after the authentication.

In some instances, being able to begin decrypting and/or restoring memory pages at an earlier stage may reduce the amount of time consumed when resuming from a reduced power mode while still ensuring that offloaded memory pages are protected. Various other techniques are described below for further improving the security of a computing device when using a reduced power mode.

Figure 1:
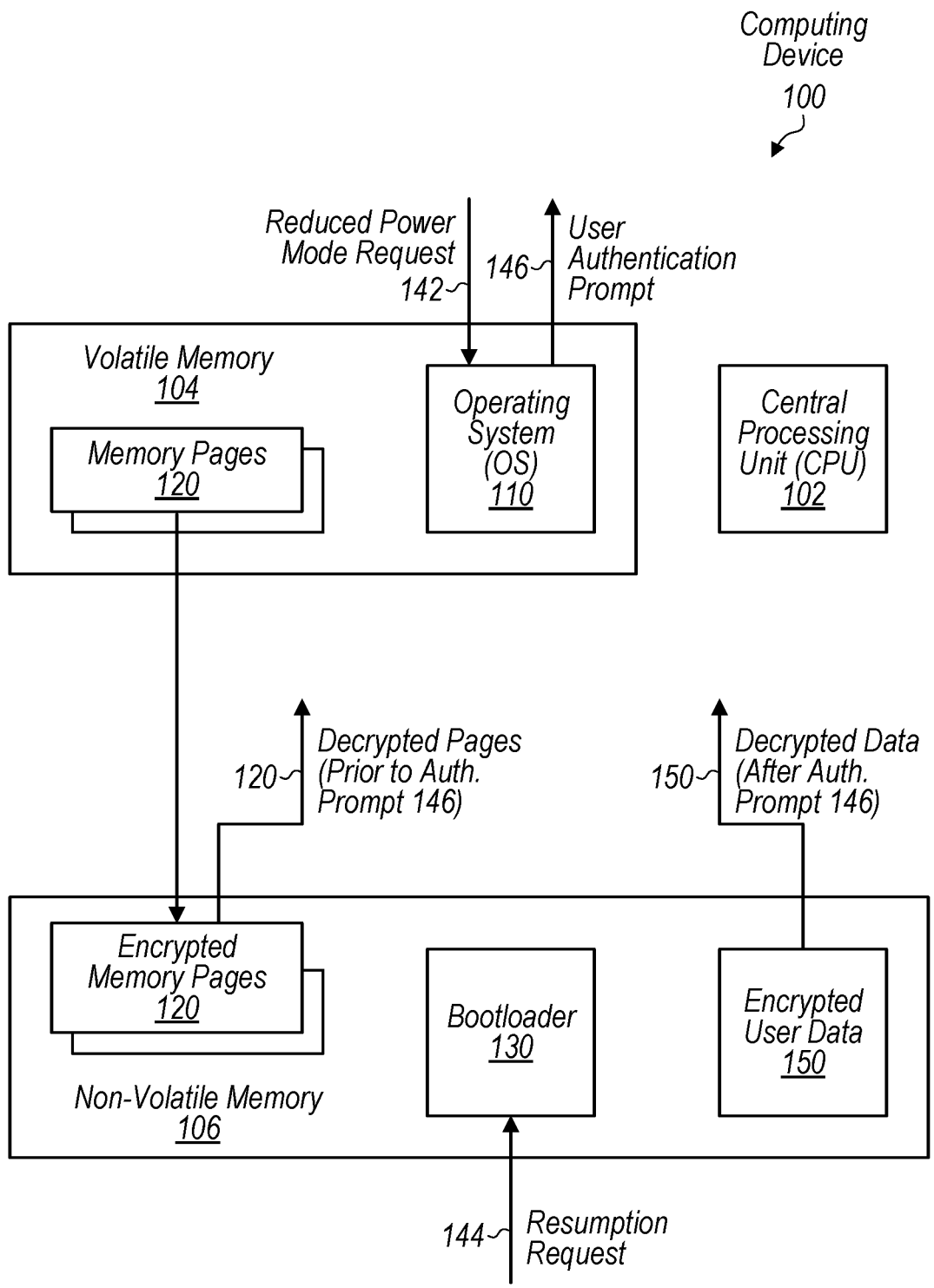
FIG. 1 is a block diagram illustrating an example of a computing device configured to securely enter and exit a reduced power mode.

Turning now to FIG. 1, a block diagram of a computing device 100 is depicted. In the illustrated embodiment, computing device 100 includes a central processing unit (CPU) 102, volatile memory 104, and a non-volatile memory 106. Volatile memory 104 includes operating system (OS) 110 and memory pages 120. Non-volatile memory 106 includes encrypted memory pages 120, bootloader 130, and encrypted user data 150. In some embodiments, computing device 100 may be implemented differently than shown. For example, more (or less) components may be included in computing device 100, actions described with respect to OS 110 and bootloader 130 may be performed by other processes, etc.

OS 110, in various embodiments, is executable by CPU 102 to manage various operations of computing device 100 including management of memory. In the illustrated embodiment, OS 110 implements a paging memory management scheme in which data stored within memory is divided into blocks/pages 120, which may be moved between volatile memory 104 and non-volatile memory 106. In some embodiments, this paging scheme may be used in conjunction with a virtual memory architecture in which data within pages 120 are addressable using virtual addresses that are mapped by OS 110 to corresponding physical addresses of memories 104 and 106 depending on the locations of pages 120 within computing device 100.

In various embodiments, computing device 100 supports one or more reduced power modes to conserve device power, which may include disabling hardware of computing device 100. As shown in FIG. 1, OS 110 may initiate placement of computing device 100 into a reduced power mode in response to a reduced power mode request 142. In some embodiments, this request 142 may be received via a user interface of computing device 100. For example, OS 110 may present a menu option selectable by a user to initiate placing device 100 into the reduced power mode. In some embodiments, request 142 may be provided by hardware in response to detection of the occurrence of some event such as a user closing a screen of computing device 100 in an embodiment in which device 100 is a laptop, for example. In some embodiments, request 142 may be received in response to detecting that a power level of a power source of the computing device has reached a threshold. For example, a power management circuit may detect that a voltage of a battery supply has satisfied a low voltage threshold and may issue a request 142 to OS 110. In other embodiments, placement into a reduced power mode may be initiated differently. As noted above, in some reduced power modes, computing device 100 may power off (e.g., power gate) volatile memory 104 (which may be implemented using RAM or any other examples of volatile memory given below with respect FIG. 6) causing the memory 104 to no longer be able to reliably store data.

In order to preserve the contents of memory 104, OS 110 may offload one or more memory pages 120 from volatile memory 104 to non-volatile memory 106 (which may be implemented by an SSD or any other examples of non-volatile memory given below with respect FIG. 6). In various embodiments, computing device 100 further encrypts the offloaded memory pages 120 in order to protect their contents. In some embodiments, these offloaded memory pages 120 are encrypted prior to storing them in non-volatile memory 106 and may be encrypted by cryptographic hardware of computing device 100. For example, as will be discussed below with respect to FIG. 2, encryption may be performed by a memory controller of non-volatile memory 106—although, in other embodiments, encryption may be performed differently. In some embodiments, this offloading may also include storing additional security information in non-volatile memory 106, which may be verified by computing device 100 when returning from a reduced power mode as will be discussed.

At a later point, computing device 100 may receive a resumption request 144 to resume normal operation. In the illustrated embodiment, this request 144 is shown as being received by bootloader 130, which may handle the initial boot of OS 110 as well as reloading OS 110 into volatile memory 104 after a request 144 has been received. In other embodiments, however, a resumption request 144 may be received differently. In some embodiments, a request 144 is received via a user interface of computing device 100 such as pushing a power button, clicking a mouse, pressing a keyboard key, etc. In some embodiments, a request 144 is provided based on a detected change corresponding to a power source of computing device 100. For example, a power manager circuit may detect a change corresponds to additional power being provided to computing device 100 (e.g., through an external power source). In some embodiments, this change corresponds to a power level of the computing device exceeding a threshold (e.g., associated with battery voltage). In some embodiments, the change corresponds to an estimated amount of time for which computer device 100 is able to function on a current power level.

Based on receiving request 144, in various embodiments, computing device 100 restores memory pages 120 from non-volatile memory 106 to volatile memory 104 including decrypting the encrypted memory pages 120. In some embodiments, these offloaded memory pages 120 are decrypted prior to storing them in volatile memory 104 and may be encrypted by cryptographic hardware of computing device 100—although, in other embodiments, encryption may be performed differently. In some embodiments, this restoration process may also include verifying additional security information such as a signature generated from memory pages 120 as will be discussed with FIG. 2.

As shown in FIG. 1, in various embodiments, computing device 100 (or more specifically OS 110 in the illustrated embodiment) presents a user authentication prompt 146 after initiating the restoring of memory pages 120. In some embodiments, this prompt 146 is presented after the restoring of pages 120 has completed (e.g., all pages 120 have been decrypted and copied into memory 104). In some embodiments, this prompt 146 is presented after restoring is initiated but may still be ongoing. For example, prompt 146 may be presented after, at least, one memory page 120 has been restored when multiple memory pages 120 are being restored. As noted above in the introduction, initiating the restoring of pages 120 earlier on may reduce the time consumed when returning from a reduced power mode as computing device 100 is not held up awaiting a user to provide a user credential requested by prompt 146.

Once a user has supplied a user credential, in various embodiments, computing device 100 performs an authentication by verifying the received user credential. This user credential may correspond to any suitable form of credential such as password, token, biometric (as will be discussed with FIG. 5), etc. Based on the authentication being successful, computing device 100 may grant user access to computing device 100 including access to other data stored in non-volatile memory 106 such as encrypted user data 150 as shown in FIG. 1. In some embodiments, granting access to encrypted user data 150 includes decrypting data 150 using a second cryptographic key distinct from the cryptographic key encrypting and decrypting memory page 120. In some embodiments, this second cryptographic key does not become available for use until after a success authentication is performed as the second cryptographic key may be protected by a user's credential.

Exemplary components of an offloading process and a restoration process will now be discussed in greater with respect to FIGS. 2 and 3.

Figure 2:
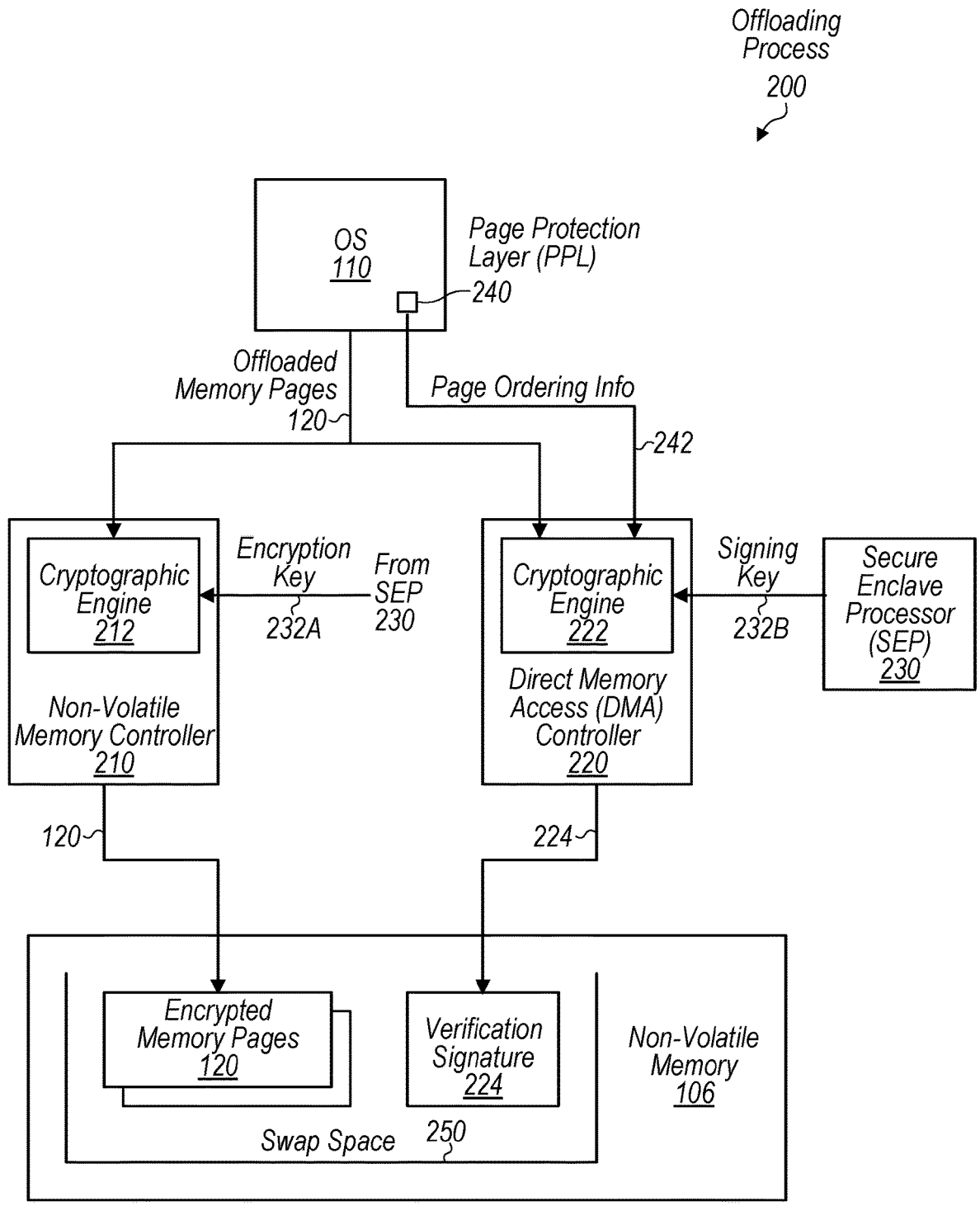
FIG. 2 is a block diagram illustrating an example of offloading memory pages in conjunction with entering the reduced power mode.

Turning now to FIG. 2, a block diagram of an offloading process 200 for moving pages 120 from volatile memory 104 to non-volatile memory 106 is depicted. In the illustrated embodiment, offloading process 200 includes use of non-volatile memory controller 210, a direct memory access (DMA) controller 220, and a secure enclave processor (SEP) 230. In other embodiments, offloading process 200 may use different components to offload pages 120—or include performance of actions other than those depicted in FIG. 2.

As noted above, in various embodiments, memory pages 120 may be encrypted as they are being offloaded to non-volatile memory 106. In the illustrated embodiment, this encryption is performed by non-volatile memory controller 210, which services read and write requests to non-volatile memory 106. In particular, controller 210 may include cryptographic hardware (shown as cryptographic engine 212) that is configured to encrypt memory pages 120 as they travel through controller 210 for storage in non-volatile memory 106. Cryptographic engine 212 may also decrypt encrypted memory pages 120 as they are read from non-volatile memory 106 and pass through controller 210 to volatile memory 104. Using cryptographic hardware in this manner may allow for encryption and decryption to be seamlessly performed when writing and reading data from memory 106. In other embodiments, however, encryption and decryption may be performed by other components of computing device 100 including, for example, software executing on CPU 102. In the illustrated embodiment, cryptographic engine 212 encrypts memory pages 120 using an encryption key 232A supplied by SEP 230 (discussed more below). As noted above, in various embodiments, this key 232A is not derived from (or more generally protected by a user authentication credential) in contrast to other keys used by computing device 100 such as a key protecting user data 150. In some embodiments, a new encryption key 232A is created each time computing device 100 enters a reduced power mode—thus, key 232A is not reused across multiple instances in which device 100 enters and exits a reduced power mode.

To further improve the integrity of encrypted pages 120, in some embodiments, computing device 100 generates one or more verification signatures 224 of the memory pages 120 being offloaded in order to verify their integrity when they are later read from non-volatile memory 106 for restoration to volatile memory 104. As used herein, the term "signature" is used generally to refer to any function that takes a key as an input and produces a value usable to verify the integrity of a set of data. Thus, the term signature includes signatures generated, for example, using the digital signature algorithm (DSA) as well as keyed-hash functions such as keyed-hash message authentication code (HMAC). In the illustrated embodiment, memory pages 120 are signed by DMA controller 220, which may facilitate moving traffic across an interconnect coupled to, for example, CPU 102, SEP 230, and/or controller 210 (e.g., fabric 610 discussed below with FIG. 6). In particular, DMA controller 220 may also include cryptographic hardware (shown as cryptographic engine 222) configured to perform cryptographic operations such as signature generation. In various embodiments, cryptographic engine 222 generates a verification signature 224 over multiple memory pages 120 being offloaded from the volatile memory 104 and also generates signature 224 in a manner that preserves the ordering of pages 120 in volatile memory 104. In some embodiments, this ordering is preserved by inputting memory pages 120 into the signature generation function of engine 222 in the ordering that the memory pages are stored in volatile memory 104. In the illustrated embodiment, this ordering information (shown as page ordering information 242) is provided by a page protection layer 240 (a protected portion of OS 110 that manages the page table for translating between virtual and physical address spaces) and may include additional information such as page numbers assigned to pages 120 for signing. In other embodiments, however, ordering information 242 may be provided from other sources. In some embodiments, cryptographic engine 222 may generate signature 224 by calculating a hash value using secure hash algorithm (SHA) over the pages 120 and further calculating an HMAC from the hash value using signing key 232B; however, in other embodiments, other suitable techniques may be employed. Once signature 224 is generated, DMA controller 220 may store it with the encrypted memory pages 120 in swap space 250—the portion of memory 106 where, in some embodiments, OS 110 stores pages 120 during normal operation when there is insufficient space in volatile memory 104 due to the use of a larger virtual address space than the physical address space. In the illustrated embodiment, cryptographic engine 222 receives a signing key 232B generated by SEP 230; however, in other embodiments, key 232B may generated differently.

SEP 230, in various embodiments, is a secure circuit including another cryptographic engine configured to generate one or more keys described herein such as encryption key 232A and signing key 232B. In some embodiments, the term "secure circuit" refers to a circuit that protects an isolated, internal resource from being directly accessed by an external circuit such as a CPU 102 and other peripherals. This internal resource may be circuitry that performs services/operations associated with sensitive data such as cryptographic circuitry configured to perform encryption and decryption, key derivation, etc. This internal resource may be memory that stores sensitive data such as a supplied user credential. As will be described in greater detail below with FIG. 5, SEP 230 may generate keys 232 as well as facilitate authenticating a user, which may be performed in response to user authentication prompt 146.

Figure 3:
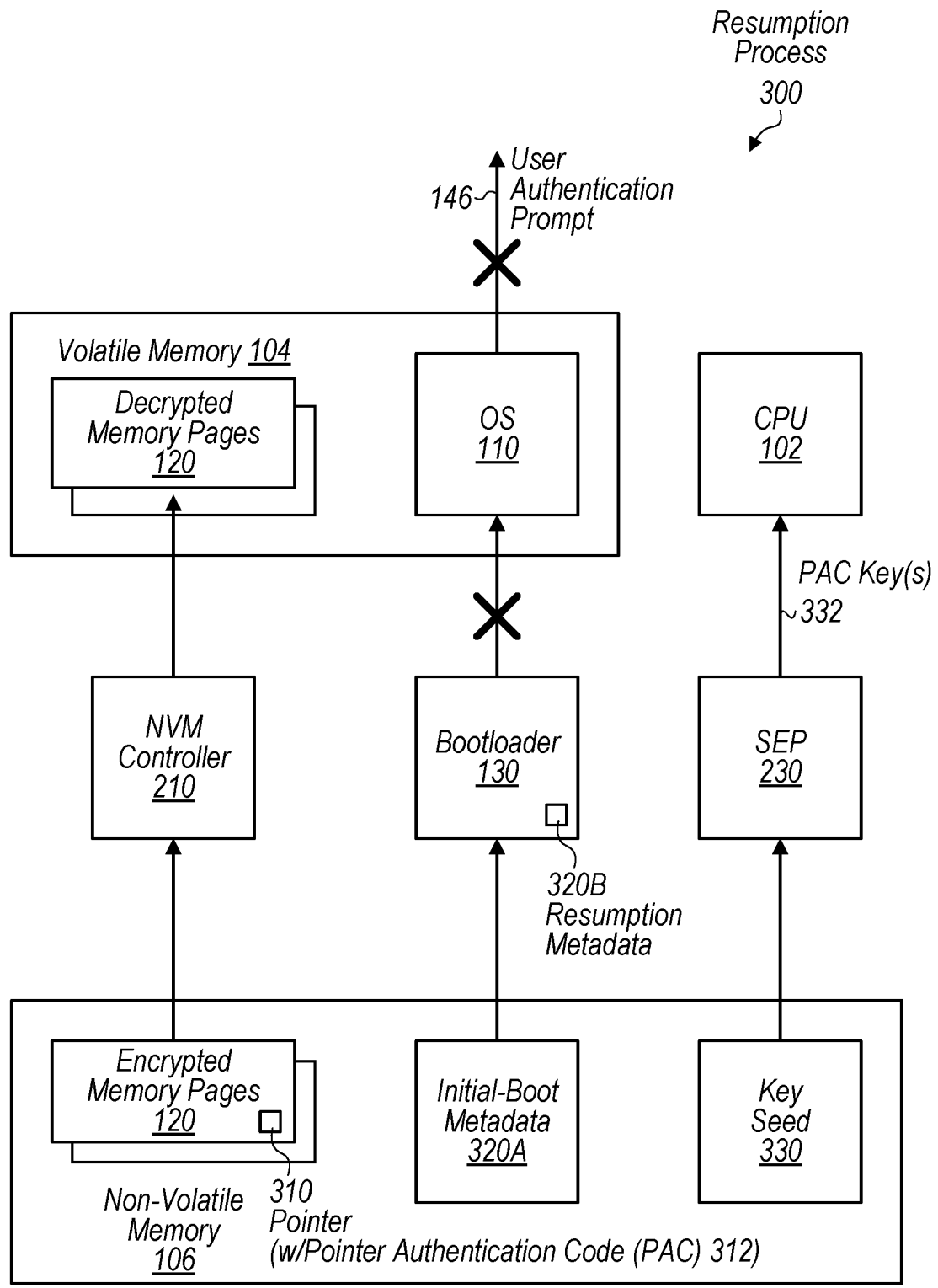
FIG. 3 is a block diagram illustrating an example of restoring memory pages in conjunction with resumption from the reduced power mode.

Turning now to FIG. 3, a block diagram of a resumption process 300 for restoring pages 120 from non-volatile memory 106 to volatile memory 104 is depicted. In the illustrated embodiment, resumption process 300 includes use of non-volatile memory controller 210, bootloader 130, and SEP 230. In other embodiments, resumption process 300 may use different components to restore pages 120—or include performance of actions other than those depicted in FIG. 3.

As has been discussed above, resumption process 300 may include decrypting memory pages 120 and storing them in volatile memory 104. In the illustrated embodiment, this decryption may again be performed by NVM controller 210. In some embodiments, resumption process 300 may include reading verification signature 224 and using it to verify pages 120 as they are being restored. In the event that the signature verification fails, in some embodiments, computing device 100 may suspend further operation and require a cold reboot of computing device 100. In some embodiments, resumption process 300 may include performance of one or more additional actions to improve the security of computing device 100 as will be discussed.

In some embodiments, computing device 100 stores a first set of metadata 320A about an initial boot of computing device 100, which may be generated by bootloader 130 and stored in non-volatile memory 106. This metadata 320A may include, for example, indications of what OS images were loaded by bootloader 130 and indications of their corresponding checksums, which may be verified by bootloader 130 during initial boot. Based on the request to resume from the reduced power mode, bootloader 130 may generate a second set of metadata 320B about the resumption from the reduced power mode. In some embodiments, computing device 100 (or more specifically bootloader 130 in the illustrated embodiment) compares initial-boot metadata 320A with resumption metadata 320B in order to determine whether there are any problematic inconsistencies. Based on the comparing, computing device 100 may determine to not present a user authentication prompt 146. In some embodiments, bootloader 130 may prevent the presentation of user authentication prompt 146 by not completing the reloading of OS 110 and requiring a cold reboot. In other embodiments in which OS 110 has been reloaded, OS 110 may be notified to restart computing device 100 without first presenting prompt 146.

In some embodiments, computing device 100 implements pointer authentication scheme in order to preserve the integrity of memory addresses/pointers 310 in memory pages 120. In such a scheme, CPU 102 may generate a pointer authentication code (PAC) 312 from a pointer 310 in a memory page 120 and using one or more PAC keys 332. This PAC 312 may be stored in the higher-order bits of the pointer 310 (which may be less frequently used in 64-bit or higher architectures) and used to subsequently verify the pointer 310. For example, a page 120 may include a branch instruction that conditionally causes execution to jump to a particular address location identified by a pointer 310. When the branch instruction is executed, CPU 102 may verify the integrity of the pointer 310 (e.g., that the pointer 310 has not been altered by some malicious process) using the included PAC 312 and a stored key 332. As CPU 102 may be powered down when entering a reduced power mode, the PAC keys 332 used to generate PACs 312 may be lost as keys 332 may reside in CPU registers—a volatile memory. In some embodiments, a key seed 330 used to derive PAC keys 332 may be stored in non-volatile memory 106 so that PAC keys 332 can be regenerated upon exiting the reduced power mode. In doing so, CPU 102 may be able to resume authenticating pointers 310 in offloaded pages 120 after computing device 100 returns from the reduced power mode. In the illustrated embodiment, SEP 230 regenerates PAC keys 332 and provides them to CPU 102—although, in other embodiments, this regeneration may be implemented differently.

Figure 4:
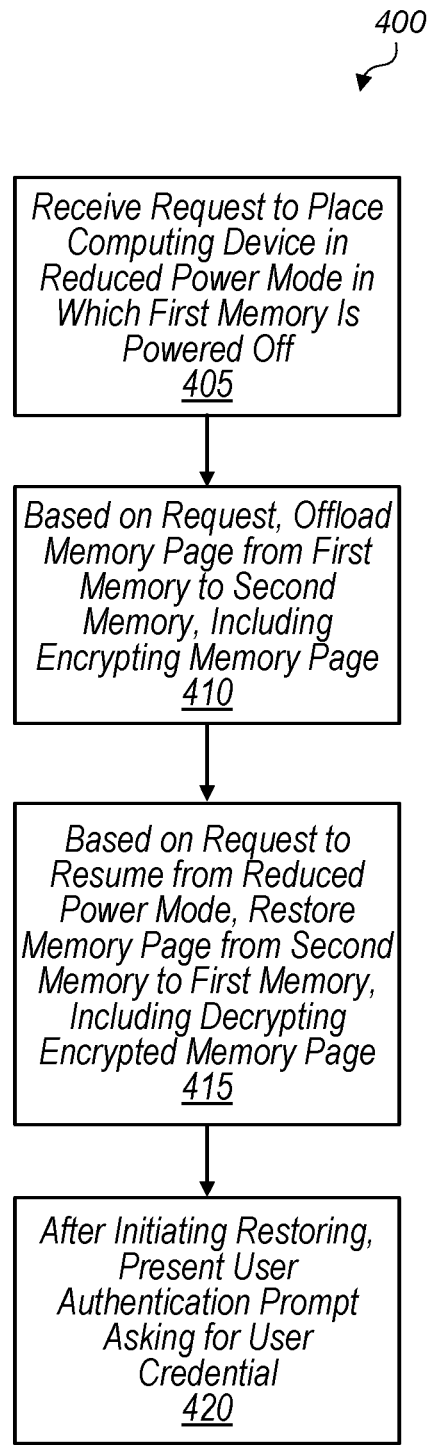
FIG. 4 is flow diagram illustrating an example of a method associated with placing a computing device into a reduced power mode.

Turning now to FIG. 4, a flow diagram of a method 400 is depicted. Method 400 is one embodiment of a method performed by a computing device, such as computing device 100, when securely transitioning to and from a reduced power mode. As noted above, performance of method 400 may reduce the time consumed when returning from a reduced power mode.

In step 405, a computing device receives a request (e.g., reduced power mode request 142) to place the computing device in a reduced power mode in which a first memory (e.g., volatile memory 104) of the computing device is powered off. In some embodiments, the computing device detects that a power level of a power source of the computing device has reached a threshold, and the request to place the computing device in the reduced power is received responsive to the detecting.

In step 410, based on the request, the computing device offloads a memory page (e.g., a memory page 120) from the first memory to a second memory (e.g., non-volatile memory 106), including encrypting the memory page. In some embodiments, the computing device generates a cryptographic key (e.g., via SEP 230) and encrypts the memory page using the cryptographic key. In some embodiments, the computing device generates a signature (e.g., a verification signature 224) of the memory page and stores the signature in the second memory. In some embodiments, the computing device generates the signature over a plurality of memory pages being offloaded from the first memory, and ones of the plurality of memory pages are input into a signature generation function based on an ordering that the memory pages are stored in the first memory.

In step 415, based on a request (e.g., resumption request 144) to resume from the reduced power mode, the computing device restores the memory page from the second memory to the first memory, including decrypting the encrypted memory page. In some embodiments, the computing device detects a change corresponding to a power source of the computing device and, based on the detecting, provides the request to resume from the reduced power mode. In some embodiments, the computing device receives user input via a user interface of the computing device and, based on the user input, provides the request to resume from the reduced power mode. In some embodiments, the restoring includes verifying the memory page against the stored signature. In some embodiments, the computing device stores a first set of metadata (e.g., metadata 320A) about an initial boot of the computing device. Based on the request to resume from the reduced power mode, the computing device compares the first set of metadata with a second set of metadata (e.g., metadata 320B) when causing the computing device to resume from the reduced power mode and, based on the comparing, determines whether to present the user authentication prompt.

In step 420, after initiating the restoring, the computing device presents a user authentication prompt (e.g., user authentication prompt 146) asking for a user credential. In some embodiments, the computing device performs an authentication by verifying a user credential received responsive to the user authentication prompt and, based on the authentication, grants access to data (e.g., user data 150) stored in the second memory. In some embodiments, the memory page is decrypted using a first cryptographic key prior to the authenticating, and the granting includes decrypting the data using a second cryptographic after the authenticating.

Figure 5:
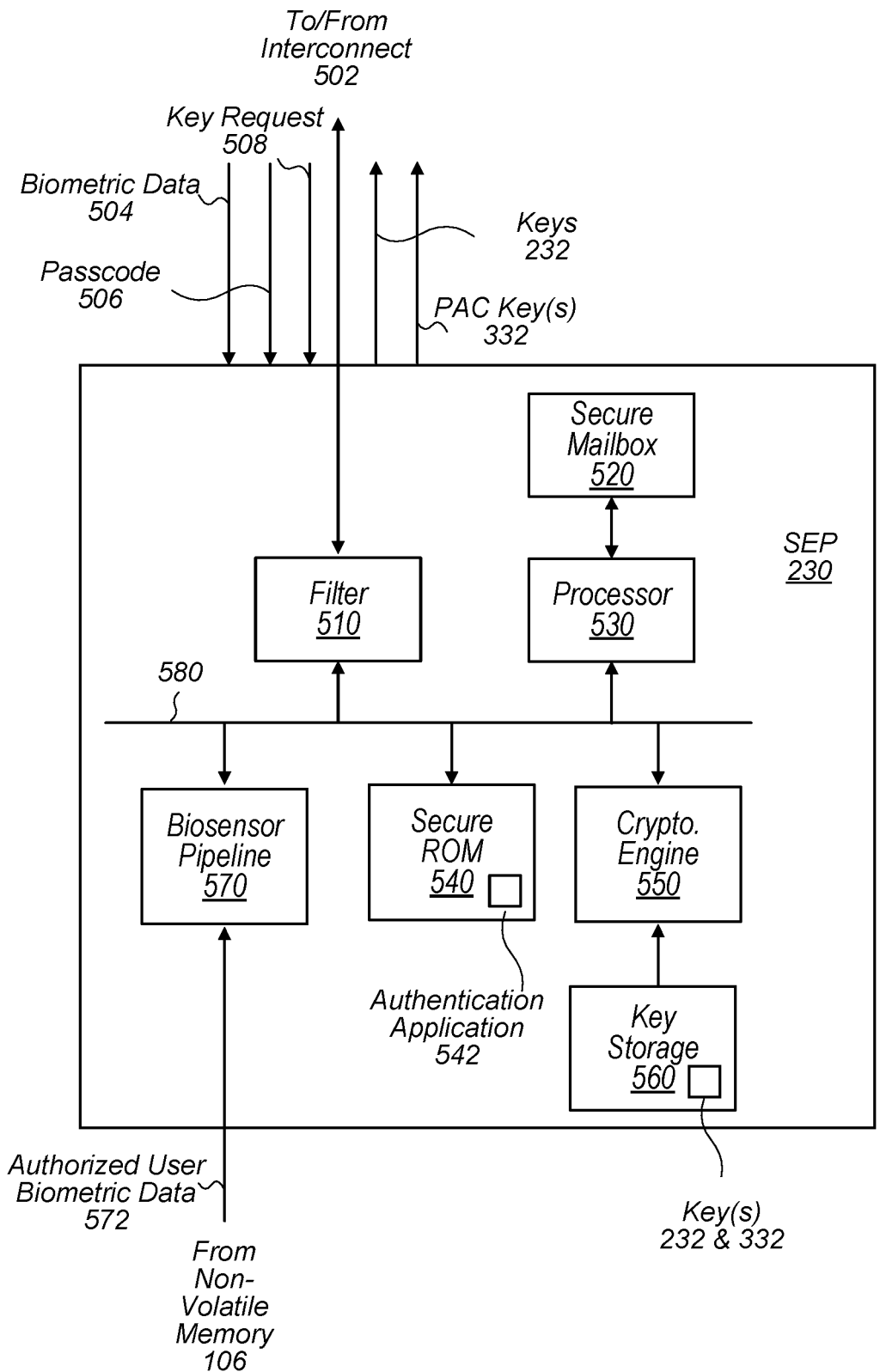
FIG. 5 is a block diagram illustrating an example of a secure enclave processor, which may be used by the computing device.

Turning now to FIG. 5, a block diagram of SEP 230 is depicted. In the illustrated embodiment, SEP 230 includes a filter 510, secure mailbox mechanism 520, processor 530, secure ROM 540, cryptographic engine 550, a key storage 560, and a biosensor pipeline 570 coupled together via an interconnect 580. In some embodiments, SEP 230 may include more (or less) components than shown in FIG. 5. As noted above, SEP 230 is a secure circuit having tamper resistance. As discussed below, SEP 230 implements tamper resistance through the use of filter 510 and secure mailbox 520.

Filter 510 is circuitry configured to tightly control access to SEP 230 to increase the isolation of the SEP 230 from the rest of computing device 100, and thus the overall security of the device 100. More particularly, in some embodiments, filter 510 may permit read/write operations from a CPU 102 (or other peripherals coupled to interconnect 502, which may facilitate communication between CPU 102, volatile memory 104, and non-volatile memory 106 in some embodiments) to enter SEP 230 only if the operations address the secure mailbox 520. Other operations may not progress from the interconnect 502 into SEP 230. Even more particularly, filter 510 may permit write operations to the address assigned to the inbox portion of secure mailbox 520, and read operations to the address assigned to the outbox portion of the secure mailbox 520. All other read/write operations may be prevented/filtered by the filter 510. In some embodiments, filter 510 may respond to other read/write operations with an error. In one embodiment, filter 510 may sink write data associated with a filtered write operation without passing the write data on to local interconnect 580. In one embodiment, filter 510 may supply nonce data as read data for a filtered read operation. Nonce data (e.g., "garbage data") may generally be data that is not associated with the addressed resource within the SEP 230. Filter 510 may supply any data as nonce data (e.g. all zeros, all ones, random data from a random number generator, data programmed into filter 510 to respond as read data, the address of the read transaction, etc.). Thus, filter 510 may prevent direct access to internal components 530-570 by an external entity such as CPU 102.

In various embodiments, filter 510 may only filter incoming read/write operations. Thus, the components of the SEP 230 may have full access to the other components of computing device 100 such as non-volatile memory 106. Accordingly, filter 510 may not filter responses from interconnect 502 that are provided in response to read/write operations issued by SEP 230.

Secure mailbox 520 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from interconnect 502. The outbox may store write data from write operations sourced by processor 530. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 102 (or other peripherals coupled to interconnect 502) may request services of SEP 230 via an application programming interface (API) supported by OS 110—i.e., a requester may make API calls that request services of SEP 230. These calls may cause corresponding requests to be written to mailbox mechanism 520, which are then retrieved from mailbox 520 and analyzed by processor 530 to determine whether it should service the requests. Accordingly, this API may be used to send, via mailbox 520, for example, authentication information received based on user authentication prompt 146, such as biometric data 504, a passcode 506, etc., for verification as well as key requests 508 to generate one or more keys described herein such as keys 232 and keys 332. By isolating SEP 230 in this manner, integrity of SEP 230 may be enhanced.

SEP processor 530 is configured to process commands received from various sources in computing device 100 and may use various secure peripherals to accomplish the commands. Processor 530 may then execute instructions stored in ROM 540 such as authentication application 542 to perform an authentication of a user in order to use cryptographic services of SEP such as performing operations associated with keys 232 and 332 discussed above. For example, SEP processor 530 may execute application 542 to provide appropriate commands to biosensor pipeline 570 in order to verify biometric data 504 collected by a biosensor of device 100. In some embodiments, program instructions executed by SEP processor 530 are signed by a trusted authority (e.g., device 100's manufacturer) in order to ensure their integrity.

Secure ROM 540 is a memory configured to store program instruction for booting SEP 230. In some embodiments, ROM 540 may respond to only a specific address range assigned to secure ROM 540 on local interconnect 580. The address range may be hardwired, and processor 530 may be hardwired to fetch from the address range at boot in order to boot from secure ROM 540. Filter 510 may filter addresses within the address range assigned to secure ROM 540 (as mentioned above), preventing access to secure ROM 540 from components external to the SEP 230. In some embodiments, secure ROM 540 may include other software executed by SEP processor 530 during use. This software may include the program instructions to process inbox messages and generate outbox messages, etc.

Cryptographic engine 550 is circuitry configured to perform cryptographic operations for SEP 230, including key generation as well as encryption and decryption using keys in key storage 560. Cryptographic engine 550 may implement any suitable encryption algorithm such as Data Encryption Standard (DES), Advanced Encryption Standard (AES), Rivest Shamir Adleman (RSA), etc. In some embodiments, engine 550 may further implement elliptic curve cryptography (ECC). In various embodiments, engine 550 is responsible for generating one or more cryptographic keys described herein such as keys 232 and 332.

Key storage 560 is a local memory (i.e., internal memory) configured to store cryptograph keys such as keys 232 and 332. In some embodiments, these keys may include keys used to establish the secure channels between SEP 230 and other elements such as non-volatile memory controller 210, DMA controller 220 and a biosensor. Key storage 560 may include any type of memory such as the various examples of volatile or non-volatile memory listed below with respect to FIG. 6. In some embodiments, storage 560 may also include a set of fuses that are burnt during a fabrication of SEP 230 (or more generally device 100) in order to record keys such as a unique identifier (UID), which may be used to derive keys described herein such as keys 232 discussed above. In some embodiments, to expand its available storage, SEP 230 may store keys generated by cryptographic engine 550 externally to SEP 230, such as in non-volatile memory 106, but encrypt those keys using one or more keys stored in key storage 560.

Biosensor pipeline 570, in one embodiment, is circuitry configured to compare biometric data 504 captured by a biosensor from a user being authenticated with biometric data 572 of an authorized user. (In another embodiment, data 504 and 572 may be compared by software such as authentication application 542.) Biometric data may be data that uniquely identifies the user among other humans (at least to a high degree of accuracy) based on the user's physical or behavioral characteristics. In some embodiments in which data 504 is collected from a user's face, pipeline 570 may perform the comparison using a collection of neural networks included in pipeline 570, each network being configured to compare biometric data 504 captured in a single frame with biometric data 572 captured in multiple frames for an authorized user. As shown, pipeline 570 may be configured to read, from non-volatile memory 106, biometric data 572, which may be protected by encryption in some embodiments and/or be stored in an associated part of non-volatile memory 106 that is only accessible to SEP 230. (In another embodiment, SEP 230 may store data 572 internally.) Based on the comparison of biometric data 504 and 572, SEP 230 may provide an authentication result indicating whether the authentication was successful or failed. Such an authentication result may be used, for example, to grant use of a key protecting data 150 discussed above.

Exemplary Computer System

Figure 6:
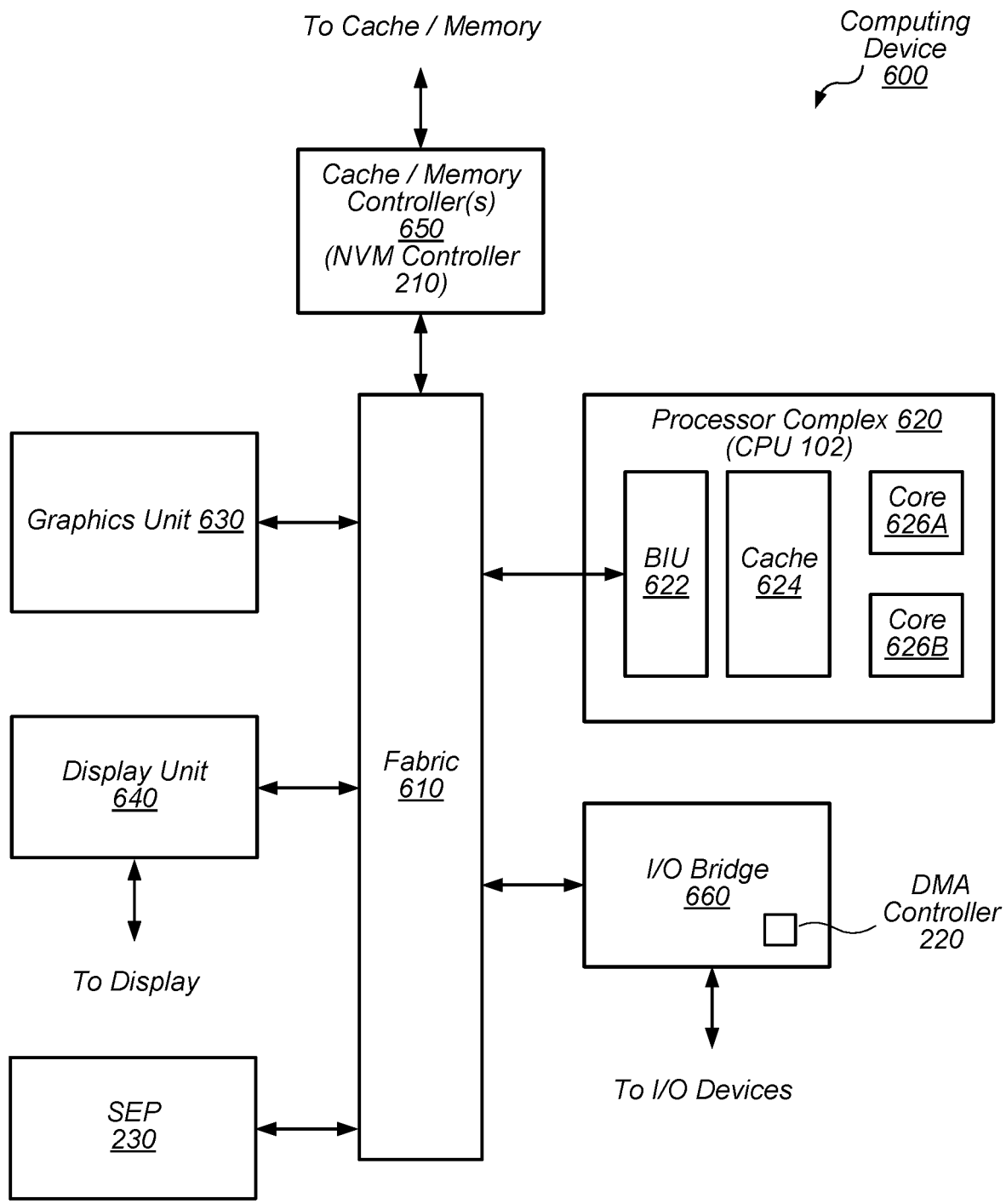
FIG. 6 is a block diagram illustrating an example of components, which may be included in the computing device.

Turning now to FIG. 6, a block diagram illustrating an exemplary embodiment of a computing device 600, which may implement functionality of computing device 100, is shown. Device 600 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 600 includes fabric 610, processor complex 620, graphics unit 630, display unit 640, cache/memory controller 650, input/output (I/O) bridge 660. In the illustrated embodiment, computing device 600 further includes SEP 230 coupled to fabric 610 and DMA controller within I/O bridge 660. In some embodiments, elements of device 600 may be included within a system on a chip (SOC). In other embodiments, computing device 600 may be implemented differently than shown.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements.

In the illustrated embodiment, processor complex 620, which may implement CPU 102 discussed above, includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown) in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA), which may include operating system instructions and user application instructions. These instructions may be stored in computer readable medium such as a memory coupled to memory controller 650 discussed below.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory controller(s) 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. In some embodiments, this volatile memory may correspond to volatile memory 104 discussed above. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to a controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, this non-volatile memory may correspond to non-volatile memory 106 coupled to memory controller 210 discussed above. As noted above, this memory may store program instructions executable by processor complex 620 to cause device 600 to perform functionality described herein.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc. In the illustrated embodiment, I/O bridge 660 includes DMA controller 220 discussed above although controller 220 may be located elsewhere in other embodiments.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

What is claimed is:

1. A non-transitory computer readable medium having program instructions stored therein that are executable by a computing device to cause the computing device to perform operations comprising:
   receiving a request to place the computing device in a reduced power mode in which a first memory of the computing device is powered off;
   based on the request, offloading a memory page from the first memory to a second memory, wherein the offloading includes encrypting the memory page;
   based on a request to resume from the reduced power mode, restoring the memory page from the second memory to the first memory, wherein the restoring includes decrypting the encrypted memory page using a first cryptographic key accessible prior to a user authentication prompt;
   after initiating the restoring, presenting the user authentication prompt asking for a user credential; and
   granting access to encrypted data stored in the second memory using a second cryptographic key made accessible in response to reception of the user credential.

2. The computer readable medium of claim 1, wherein the operations further comprise:
   performing an authentication by verifying a user credential received responsive to the user authentication prompt, wherein the second cryptographic key is protected by the user authentication credential.

3. The computer readable medium of claim 2,
   wherein the granting includes deriving the second cryptographic key based on the user credential.

4. The computer readable medium of claim 1, wherein the encrypting includes:
   generating the first cryptographic key in response to the request to place the computing device in a reduced power mode; and
   encrypting the memory page using the first cryptographic key.

5. The computer readable medium of claim 1, wherein the operations further comprise:
   detecting a change corresponding to a power source of the computing device; and
   based on the detecting, providing the request to resume from the reduced power mode.

6. The computer readable medium of claim 1, wherein the operations further comprise:
   receiving user input via a user interface of the computing device; and
   based on the user input, providing the request to resume from the reduced power mode.

7. The computer readable medium of claim 1, wherein the operations further comprise:
   detecting that a power level of a power source of the computing device has reached a threshold, wherein the request to place the computing device in the reduced power mode is received responsive to the detecting.

8. The computer readable medium of claim 1, wherein the offloading includes:
   generating a signature of the memory page;
   storing the signature in the second memory; and
   wherein the restoring includes verifying the memory page against the stored signature.

9. The computer readable medium of claim 8, wherein the generating includes:

generating the signature over a plurality of memory pages being offloaded from the first memory, wherein ones of the plurality of memory pages are input into a signature generation function based on an ordering that the memory pages are stored in the first memory.

10. The computer readable medium of claim 1, wherein the operations further comprise:
storing a first set of metadata about an initial boot of the computing device, wherein the first set of metadata is stored in the second memory;
based on the request to resume from the reduced power mode, comparing the first set of metadata with a second set of metadata when causing the computing device to resume from the reduced power mode; and
based on the comparing, determining whether to present the user authentication prompt.

11. A computing device, comprising:
one or more processors; and
memory having program instructions stored therein that are executable by the one or more processors to cause the computing device to perform operations comprising:
receiving a request to place the computing device in a reduced power mode in which a first memory of the computing device is powered off;
based on the request, offloading a memory page from the first memory to a second memory, wherein the offloading includes encrypting the memory page;
based on a request to resume from the reduced power mode, restoring the memory page from the second memory to the first memory, wherein the restoring includes decrypting the encrypted memory page using a first cryptographic key accessible prior to a user authentication prompt;
after initiating the restoring, presenting the user authentication prompt asking for a user credential; and
granting access to encrypted data stored in the second memory using a second cryptographic key made accessible in response to reception of the user credential.

12. The computing device of claim 11, wherein the operations further comprise:
after the user authentication, using the user credential to derive the second cryptographic key.

13. The computing device of claim 11, wherein the operations further comprise:
providing the request to resume from the reduced power mode in response to detecting a change associated with a power source of the computing device.

14. The computing device of claim 11, wherein the offloading includes generating a signature based on the memory page; and
wherein the restoring includes verifying the signature against the memory page from the second memory.

15. The computing device of claim 11, wherein the operations further comprise:
storing a first set of metadata about an initial boot of the computing device; and
prior to presenting the user authentication prompt, verifying the first set of metadata matches a second set of metadata associated with resuming from the reduced power mode.

16. A method, comprising:
receiving, by a computing device, a request to place the computing device in a reduced power mode in which a first memory of the computing device is powered off;
based on the request, offloading, by the computing device, a memory page from the first memory to a second memory, wherein the offloading includes encrypting the memory page;
based on a request to resume from the reduced power mode, restoring, by the computing device, the memory page from the second memory to the first memory, wherein the restoring includes decrypting the encrypted memory page using a first cryptographic key accessible prior to a user authentication prompt; and
after initiating the restoring, presenting, by the computing device, the user authentication prompt asking for a user credential; and
granting, by the computing device, access to encrypted data stored in the second memory using a second cryptographic key made accessible in response to reception of the user credential.

17. The method of claim 16, further comprise:
after the user authentication, deriving, by the computing device, the second cryptographic key based on the user credential.

18. The method of claim 16, wherein the request to resume from the reduced power mode corresponds to a user input received via a user interface.

19. The method of claim 16, wherein the offloading includes storing a signature generated based on the memory page in the second memory; and
wherein the restoring includes using the signature to verify the memory page from the second memory.

20. The method of claim 16, further comprising:
storing, in the second memory, a first set of metadata about an initial boot of the computing device;
based on the request to resume from the reduced power mode, verifying the first set of metadata against a second set of metadata when causing the computing device to resume from the reduced power mode; and
based on the verifying, determining whether to present the user authentication prompt.

* * * * *